Dec. 11, 1934.    A. J. McMASTER    1,984,312
PHOTOCELL CIRCUITS
Filed Sept. 3, 1929
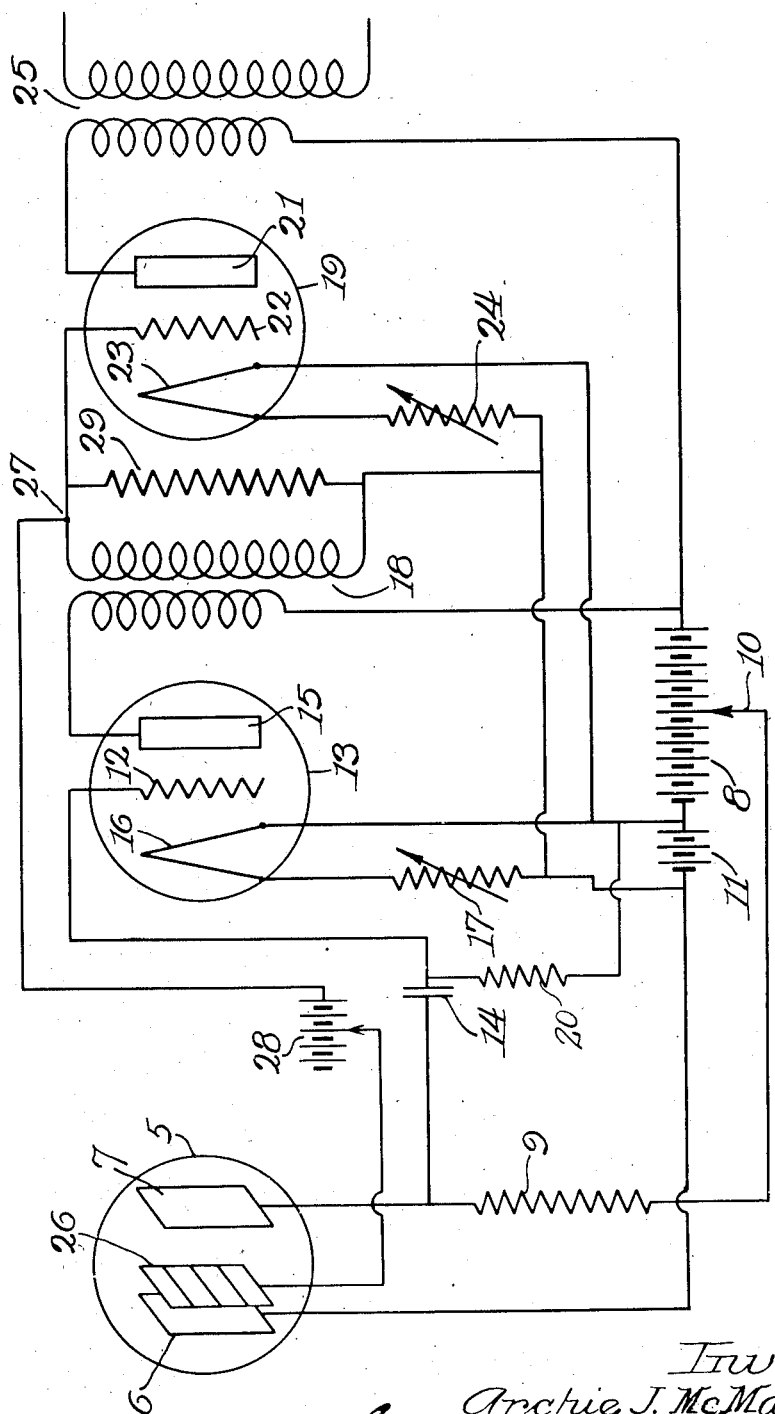
Inventor
Archie J. McMaster
By George E. Mueller    Attys.

Patented Dec. 11, 1934

1,984,312

UNITED STATES PATENT OFFICE 1,984,312

PHOTOCELL CIRCUITS

Archie J. McMaster, Chicago, Ill., assignor to G-M Laboratories, Inc., Chicago, Ill., a corporation of Illinois Application September 3, 1929, Serial No. 390,009

6 Claims. (Cl. 250—41.5)

My invention relates to a photoelectric cell and circuit therefor.

One of the outstanding problems in the application of photoelectric cells to certain uses arises from the fact that the current produced by such a cell is exeremely small. In television for instance, considerable difficulty is experienced in producing a current which is above the noise or interference level. If the original current is below the noise level elaborate precautions must be taken to shield it from interference until it is amplified above the noise level. Otherwise the interfering currents due to jars to the apparatus or atmospheric disturbances will be amplified to such an extent as to produce serious distortion of the signal current.

An object of the invention is to provide a highly sensitive photoelectric cell.

A further object is to provide a cell having a control electrode for increasing its sensitivity.

A further object is to provide a circuit for feeding back energy to a photoelectric cell to increase its sensitivity.

A further object is to provide a circuit for impressing a potential upon the control electrode of a photoelectric cell in phase with the space current of the cell to increase its effectiveness.

Other objects and advantages will appear as the description proceeds.

Referring to the drawing, the single figure diagrammatically illustrates a photoelectric cell and circuit therefor embodying the invention. Photoelectric cell 5 is provided with a cathode 6 having a coating of a suitable electron emissive substance which is responsive to light such as the hydride of an alkali metal. Spaced from cathode 6 is an anode 7 upon which battery 8 impresses a positive potential through a resistance 9. The connection to battery 8 from plate 7 is preferably made through a variable tap 10 to permit regulation of the voltage applied to the plate or anode of the photoelectric cell 5. The opposite terminal of battery 8 is connected in series through a heating battery 11 to the cathode 6 thereby establishing a potential difference between the cathode and anode to cause the anode to absorb electrons emitted by the cathode.

When a light beam of varying intensity impinges upon cathode 6 a current of varying intensity flows between the cathode and anode and in the external circuit of the photoelectric cell. On account of the resistance element 9, a varying potential will be impressed upon grid 12 of an amplifying audion 13 through capacity 14. Audion 13 is provided with a plate 15 and a filament 16, the latter being supplied with a heating current from battery 11 through a variable resistance 17 by means of which the current through the filament and therefore its temperature may be regulated. A grid leak 20 provides a return path to the filament 16 for the direct current component of the grid current, the voltage drop across the same serving to bias the grid 12. The output or plate circuit of audion 13 is coupled through a transformer 18 to a second similar audion 19 having a plate 21, grid 22 and filament 23. The plate circuits of both audions are connected to the positive side of battery 8. Filament 23 of audion 19 is connected in parallel with filament 16 to battery 11 and the current therethrough may be regulated by means of a variable resistance 24. The output or plate circuit of audion 19 includes a transformer 25 for transmitting the amplified energy to other amplifying devices or to any suitable device to be actuated in response to the photoelectric current of cell 5.

A light beam of varying intensity upon the cathode 6 produces a varying space current in the cell between the cathode and anode. The velocity of the electrons issuing from the cathode depends upon the color of light striking the cathode and their number is governed by the intensity of the light. However, I have found that the velocity of the electrons from the cathode may be controlled by an electrostatic field in the vicinity of, or surrounding the cathode. I therefore, provide a control electrode 26 in close proximity to the cathode so that a high potential gradient will exist between the control electrode and cathode when a potential difference exists between these elements. If now a potential varying in phase and frequency with the space current due to the varying intensity of the light is impressed upon the control electrode an additional fluctuation or alternating current component will result, which is additive to the space current due to the varying intensity of light.

The varying space current in cell 5 passes through resistance 9 and impresses an alternating voltage upon the grid 12 of audion 13. This voltage is amplified by audion 13 causing an amplified current to flow in the primary of transformer 18 and inducing a varying potential at point 27 in the secondary circuit of the transformer which is in the same phase and of the same frequency as the space current in cell 5. This varying potential is impressed upon control electrode 26 by connecting the control electrode to point 27. The opposite side of transformer 18 is connected to the negative terminal of battery 11 to maintain this side at the same potential as cathode 6 so that the varying potential at point 27 produces a varying potential of control electrode 26 with respect to the cathode. A negative potential on the control electrode will retard the velocity of the electrons issuing from the cathode and reduce the number which have sufficient velocity to reach the anode. A positive potential on the control electrode will on the other hand, increase the velocity of the electrons issuing from the cathode and increase the number of electrons which have sufficient velocity to reach the anode. The current fluctuation in cell 5 due to the varying intensity of the light striking the cathode will therefore, be augmented by the varying potential of the control electrode.

A suitable biasing battery 28 may also be provided in the connection between the electrode 26 and transformer to reduce the direct current component of current flowing in the cell. I have also found that by placing variable biasing means in the lead to the control electrode a point may be selected upon the operating characteristic curve of a cell at which the cell operates most efficiently. In order to obviate the necessity of the control current for electrode 26 passing through the secondary of transformer winding 18, a high resistance 29 may be shunted across the secondary of the transformer.

In the preferred embodiment of the invention the photoelectric cell is filled with an inert gas at a low pressure. In a cell of this type the control electrode has the additional effect of controlling the ionization of the gas. Ionization is the result of the collision of the electrons emitted from the cathode with the atoms or molecules of the gas. If the electrons are emitted at high velocity ionization will be great providing additional free negative electrons to be absorbed by the anode and positive ions which will pass to the cathode 6. A decrease in the velocity of the electrons will decrease the amount of ionization and decrease the number of free electrons available for absorption by the anode. It will be seen, therefore, that the control electrode not only controls the pure space discharge, but also the ionization current is controlled in the same manner with the result that the sensitivity of the tube is further increased.

The apparatus described is applicable to photoelectric cells used in talking moving pictures, television, and many other purposes. In many cases photoelectric cells of the required sensitivity must be made of such large dimensions as to render them cumbersome. A cell constructed in accordance with this invention may be made many times smaller and produce a current which is above the interference level.

It will be understood that the apparatus described is merely a convenient and useful form of the invention and that many modifications may be made therein without departing from the spirit and scope of the invention.

I claim:

1. In an apparatus of the class described, a photoelectric cell having a cathode and anode and a control electrode, an audion, an input circuit for said audion, said cathode and anode being connected to the input circuit of said audion, an output circuit for said audion, said control electrode being connected to such a point in said output circuit as to impress a potential in phase with the space current of the photoelectric cell upon said control electrode.

2. In an amplifying circuit including a photoelectric cell having a cathode, an anode, and a control electrode, an audion having an input circuit connected to the cathode and anode of said cell, a transformer in the output circuit of said audion, and a lead connecting the control electrode to the secondary circuit of said transformer to feed back energy to the photoelectric cell whereby the sensitivity of said cell is increased.

3. In an amplifying circuit including a photoelectric cell having a cathode, an anode, and a control electrode, an audion, a resistance coupling between the output of said cell and the input of said audion, a second audion transformer coupled to the first audion, and a lead from the secondary of said transformer to the control electrode of said cell for feeding back energy to said cell whereby its sensitivity is increased.

4. In an amplifying circuit for a photoelectric cell having a cathode, an anode, and a control electrode, an audion having its input circuit connected to the output circuit of said cell, a transformer in the output circuit of said audion, a lead connecting said control electrode to a point in the secondary circuit of said transformer to feed back energy to said cell, and means for negatively biasing said control electrode.

5. In an amplifying circuit for a photoelectric cell having a cathode, an anode, and a control electrode, an audion, having an input circuit coupled to the output circuit of said cell, a transformer in the output circuit of said audion, a lead connecting said control electrode to the secondary of said transformer to feed energy back to said cell, and a resistance shunting the secondary of said transformer to facilitate the feed back of energy to said cell.

6. In an apparatus of the class described, a photoelectric cell having a cathode, an anode and a control electrode, an audion, an input circuit for said audion, said cathode and anode being connected to the input circuit of said audion, an output circuit for said audion, said control electrode being connected to such a point in said output circuit as to impress upon said control electrode a potential having such a phase relation to the photoelectric response of the cell as to augment said photoelectric response of said cell.

ARCHIE J. McMASTER.